United States Patent [19]

Kawamura

[11] Patent Number: 4,884,406

[45] Date of Patent: Dec. 5, 1989

[54] TURBOCHARGER

[75] Inventor: Hideo Kawamura, Samukawa, Japan

[73] Assignee: Isuzu Motors Limited, Tokyo, Japan

[21] Appl. No.: 231,690

[22] Filed: Aug. 12, 1988

[30] Foreign Application Priority Data

Aug. 17, 1987 [JP] Japan ................................ 62-203142

[51] Int. Cl.⁴ ........................... F02B 37/00; F02C 7/06

[52] U.S. Cl. ...................................... 60/605.3; 60/608

[58] Field of Search ........................ 60/605.3, 607, 608

[56] References Cited

U.S. PATENT DOCUMENTS 4,363,214 12/1982 Kiser .................................. 60/605.3
4,769,993 9/1988 Kawamura ........................ 60/607 X

FOREIGN PATENT DOCUMENTS 96367 12/1983 European Pat. Off. .
159146 10/1985 European Pat. Off. .
3544247 8/1986 Fed. Rep. of Germany .
124023 7/1983 Japan .
221427 12/1984 Japan ..................................... 60/608
221428 12/1984 Japan .
195329 10/1985 Japan .
557261 11/1943 United Kingdom .
2120414 11/1983 United Kingdom ............... 60/605.3

*Primary Examiner*—Michael Koczo
*Attorney, Agent, or Firm*—Browdy and Neimark

[57] ABSTRACT

The turbocharger in accordance with the present invention is characterized in that when the temperature of a turbine is above a predetermined temperature after the stop of operation of an engine with a turbocharger being operated at a high load in an internal combustion engine, control is made so as to operate an A.C. generator-motor as a motor, air from a compressor or cooling air is fed into the turbine through an exhaust pipe to disspate the heat of, and cool, the turbine that has attained a high temperature by receiving the heat of an exhaust gas so that a magnetic rotor consisting of a permanent magnet and disposed on a shaft between the turbine and the compressor can be protected from the high heat of the turbine and bearings can be lubricated by feeding a lubricating oil to the bearings by rotating the shaft of the turbocharger during the period in which the turbine is at a high temperature, thereby preventing carbonization of the lubrucating oil and seizure of the bearings.

11 Claims, 3 Drawing Sheets

19 20 10 9 27 2 26 19 4 26 3 16 29 32 33 25 24 B C 15 14 31 6 31 32 33 28 23 22 18 26 17 21 A

TURBOCHARGER

BACKGROUND OF THE INVENTION

1. Field of the Invention

This invention relates to a turbocharger applied to a car engine.

2. Description of the Prior Art

A turbocharger which can provide supercharging of a suitable and sufficient quantity of air in a wide range of a low speed to a high speed in an internal combustion engine equipped with a turbocharger has been disclosed, for example, in Japanese Patent Laid-Open No. 195329/1985 filed by the inventor of the present invention. The turbocharger of this prior art will be described with reference to FIG. 4 of the accompanying drawings. The turbocharger 40 of the internal combustion engine includes a turbine 41 which is driven by the exhaust gas energy of the internal combustion engine and a compressor 42 which supercharges air into a cylinder when driven by the turbine 41, and further includes a motor-generator 43 which is driven by the turbine 41. The turbine 41, the motor-generator 43 and the compressor 42 are disposed sequentially on a shaft 44. This shaft 44 is fitted rotatably to a housing 48 through a bearing 49 and a floating metal 50. The motor-generator 43 consists of a magnetic rotor 46 fixed to the shaft 44 and a stator coil 47 fitted to the housing 48 and is operated as a motor or a generator in accordance with the operating condition of the internal combustion engine. The motor-generator 43 is operated as the motor in at least the low speed/high load operating range of the internal combustion engine.

In the turbocharger 40 of the internal combustion engine described above, the turbine 41 receives the heat energy from the exhaust gas energy and attains a high temperature. However, since the A.C. generator-motor, that is, the motor-generator 43 equipped with the magnetic rotor 46 consisting of a permanent magnet, is disposed on the shaft 44 that connects and drives the turbine 41 and the compressor 42, the magnetic rotor 46 disposed between the turbine 41 and the compressor 42 is affected by the heat of the turbine 41 or the heat transferred thereto by heat transfer and radiation through the turbine blade 45 and the shaft 44 when the turbine 41 reaches a high temperature. Here, the problem develops in that the magnetic rotor 46 made of the permanent magnet in the motor-generator 43 is not much resistant to the heat of high temperature. In other words, the permanent magnet is very weak to the heat and when the temperature is about 200° C. or more, its demagnetizing factor gets deteriorated drastically. For example, the demagnetizing factor is about 5% at about 200° C. but is as high as about 30% at about 300° C. If the turbocharger is stopped rapidly particularly when it is operated at a high load, the overall temperature becomes so high that the A.C. magnetic rotor as the permanent magnet is demagnetized disadvantageously. For instance, there is the possibility that the permanent magnet gets demagnetized by the heat of the exhaust system of the engine when the engine stops after the car drives on a highway and comes to halt, for example.

Furthermore, a lubricating oil for lubricating the bearings 49 and the floating metal 50 that support the shaft of the turbocharger 40 is carbonized and adheres by the heat from the turbine 41 receiving the exhaust gas energy and this adhering lubricating oil brings the bearings 49 and the floating metal 50 into a sticky state.

Accordingly, when the turbocharger is operated next, its operation is inhibited. Therefore, in the turbocharger equipped with the A.C. generator-motor in an internal combustion engine, there remains the problem how the bearings supporting the magnetic rotor of the A.C. generator-motor and the shaft can be protected from the heat transferred from the turbine.

SUMMARY OF THE INVENTION

It is therefore a main object of the present invention to solve the problems with the prior art described above and to provide a turbocharger which dissipates the heat transferred through conduction and radiation from a turbine which attains a high temperature on receiving the heat of an exhaust gas, by blowing air or cooling air to the turbocharger even after driving of the turbocharger in a high load state in an internal combustion engine thereby to cool the turbine and to protect a magnetic rotor consisting of a permanent magnet and disposed on a shaft between the turbine and a compressor from the high heat of the turbine, rotates the shaft of the turbocharger while the turbine is at a high temperature so as to lubricate bearings and to protect carbonization and adherence of the lubricating oil due to the stop of operation and seizure of the bearings.

It is therefore an object of the present invention to provide a turbocharger characterized in that an A.C. generator-motor is disposed on a shaft equipped with a turbine blade at one of its ends and with an impeller at the other and supporting them through bearings, control is made so as to operate the A.C. generator-motor as a motor when the temperature of a turbine is above a predetermined set temperature after the stop of operation of an engine, the impeller of a compressor and the turbine blade fitted to the shaft are subsequently rotated even though the engine is stopped after the turbocharger is operated at a high load (in this case, the shaft rotates at a very high speed of above about 100,000 rpm, for example), the air or cooling air is sent into the turbine from the compressor through an exhaust pipe, more definitely through a pipe connecting directly the compressor to the turbine, so as to dissipate the heat of the turbine and to cool the turbine.

It is another object of the present invention to provide a turbocharger characterized in that a valve is disposed in the pipe connecting directly an intake pipe to an exhaust pipe, control is made so as to open this valve when the A.C. generator-motor is operated as a motor when the temperature of a housing is above the predetermined set temperature after the stop of operation of the engine, and cold air is forcedly fed into the turbine to promote cooling of the turbine.

It is still another object of the present invention to provide a turbocharger characterized in that the operation time of the A.C. generator-motor is set by a timer, the A.C. generator-motor is stopped automatically after it is operated for a predetermined period and the turbine is cooled, and at times, the temperature of the housing such as a turbine housing is detected to make control so that the A.C. generator-motor is operated as a motor until the temperature of the housing falls below the predetermined set temperature.

It is still another object of the present invention to provide a turbocharger characterized in that a lubrication system for lubricating the bearings during the operation period of the A.C. generator-motor as a motor in the turbocharger is forcedly actuated or an oil reservoir is disposed above a lubrication path of a lubricating oil for the bearings, the lubricating oil is absorbed by the bearings for self-lubrication by the natural drop of the lubricating oil with the rotation of the shaft, so as to prevent carbonization of the lubricating oil due to the heat and its adhesion to the bearings and to the shaft, as well as the loss and increase in resistance, and to prevent seizure of the shaft and the bearings and any disadvantages when the turbocharger is operated when the engine is driven.

It is still another object of the present invention to provide a turbocharger characterized in that the temperature of the A.C. generator-motor consisting of the shaft and a permanent magnet transferred thereto from the turbine through the shaft is reduced so that the heat from the turbine to the A.C. generator-motor including the permanent magnet is dissipated completely, the A.C. generator-motor consisting of the permanent magnet is free from the adverse influences of the heat, the original function of the permanent magnet is exhibited fully and the A.C. generator-motor has high durability.

DESCRIPTION OF THE PREFERRED EMBODIMENT

Hereinafter, the turbocharger in accordance with one embodiment of the present invention will be described in detail with reference to the accompanying drawings.

Figure 1:
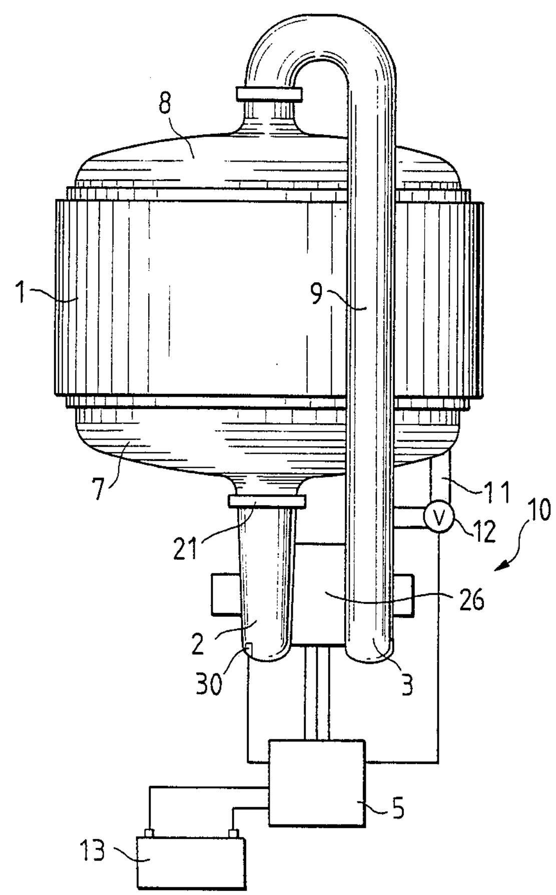
FIG. 1 is a schematic view showing a turbocharger in accordance with one embodiment of the present invention.
Figure 4:
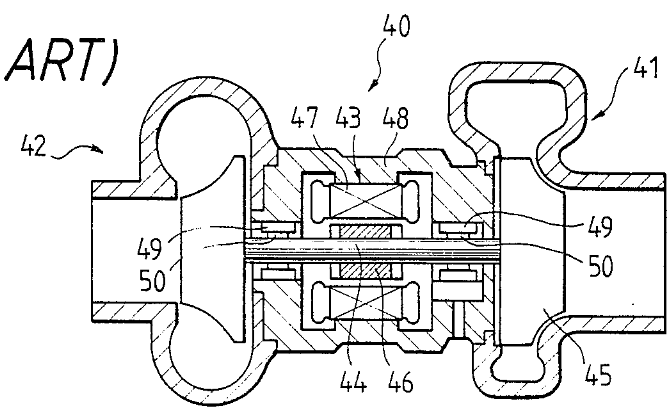
FIG. 4 is a sectional view showing a heretofore known turbocharger of an internal combustion engine.
Figure 2:
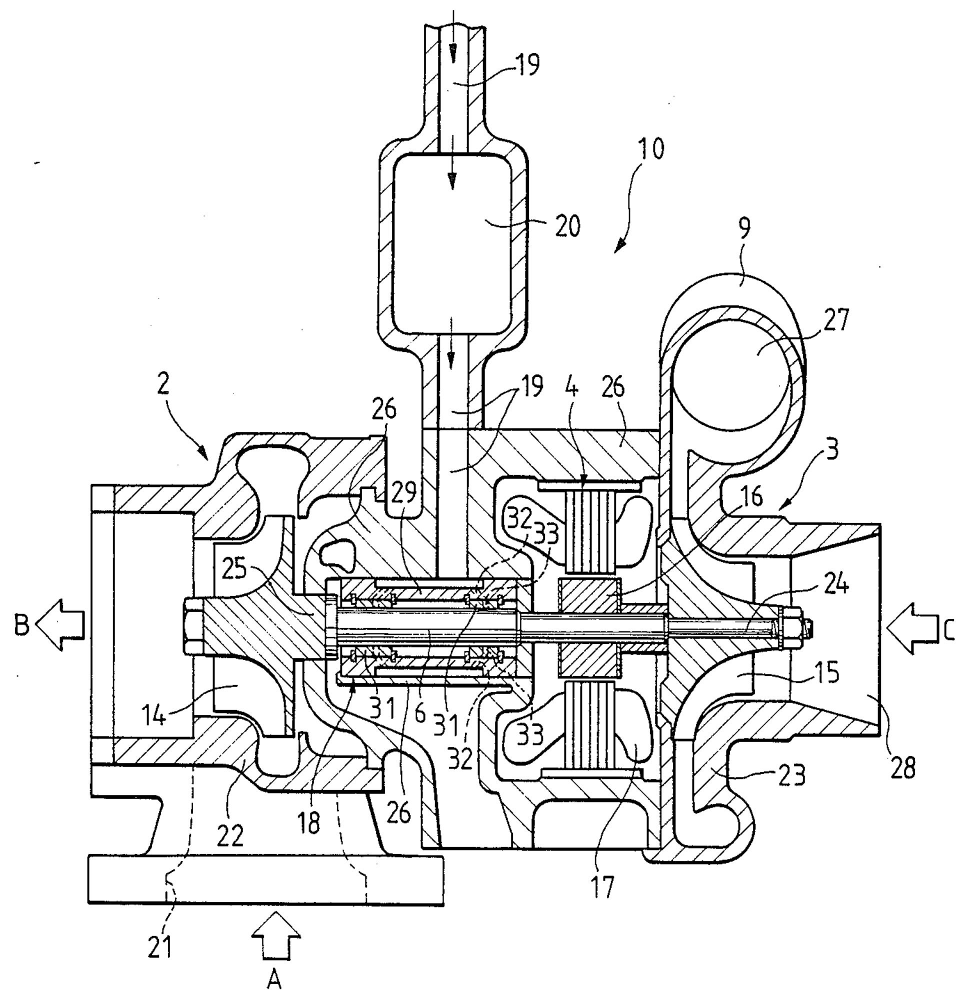
FIG. 2 is a sectional view of the principal portions of FIG. 1.

In FIGS. 1 and 2, the turbocharger in accordance with the present invention is represented generically by reference numeral 10. This turbocharger 10 includes a turbine 2 driven by exhaust gas of an engine 1, a compressor 3 which supercharges air when driven by the turbine 2 and an A.C. motor-generator 4 driven by the turbine 2. This A.C. motor-generator operates as a generator for generating A.C. power or as a motor generating mechanical power upon receipt of the A.C. power and is a ultra-high speed motor-generator permitting the revolution of the shaft 6 at about 100,000 rpm. As to the turbine 2, an exhaust blade or a turbine blade 14 is disposed inside a turbine housing 22. A temperature sensor 30 for detecting the temperature of the housing 22 is placed therein. An impeller 15 is disposed inside a compressor housing 23 of the compressor 3. A compressor scroll 27 of the compressor 3 is communicated with an intake manifold 8 of the engine 1 through an intake pipe 9.

Furthermore, the turbine blade 14 and the impeller 15 are coupled by the shaft 6. In other words, the impeller 15 is fixed to one of the ends of the shaft 6 of the turbocharger 10 through a compressor shaft portion 24 which is integral with the shaft 6 and the turbine blade 14 is fixed to the other end of the shaft 6 through a turbine shaft 25. The A.C. generator-motor 4 which is disposed at an intermediate portion of the shaft 6 coupling the turbine blade 14 and the impeller 15 has the same construction and function as the motor-generator disclosed in the turbocharger of an internal combustion engine of the afore-mentioned Japanese Patent Laid-Open No. 195329/1985 filed by the inventor of the present invention. This A.C. generator-motor 4 consists of a magnetic rotor 16 made of a permanent magnet fitted to the shaft 6 that penetrates through the interior of the center housing 26, and extending in an axial direction, and a stator coil 17 including a reduced thickness pipe, a stator core, and the like.

The shaft 6 of the turbocharger 10 is supported rotatably by bearings 18 that are fitted to the center housing 26. The turbine blade 14 receives the flow of the exhaust gas sent from a direction represented by arrow A through the exhaust manifold 7 of the engine 1, that is, the exhaust gas energy, and rotates, and the exhaust gas is discharged in the axial direction, that is, in the direction represented by arrow B. The impeller 15 of the compressor 3 pressure-converts the air introduced from the intake port 28 into the compressor scroll 27 by a diffuser as represented by arrow C and sends it into the intake manifold 8 of the engine 1 through the pair path, that is, the intake pipe 9. The intake pipe 9 and the exhaust manifold 7 are communicated with each other through the pipe 11 and moreover, a change-over valve 12 is disposed in this pipe 11. It is of course possible, at times, to directly connect the outlet of the compressor 3 to the inlet of the turbine 2 by a pipe equipped with the change-over valve 12. This A.C. generator-motor 4 is controlled by a controller 5, is driven by the turbine 2 to induce a voltage in the stator coil 17 and returns this voltage to the power supply side. It functions as a generator which charges a regenerated voltage in a battery 13 and also as a motor which receives the A.C. power from the battery 13.

The shaft 6 is supported in the center housing 26 by the bearings 18 and this bearing 18 is lubricated by a lubricating oil supplied from a lubricant supply path 19 communicating with a lubricant supply source such as an oil gallery. An oil reservoir 20 is disposed in the lubricant supply path 19 above the bearings 18 and the lubricating oil staying in the oil reservoir 20 is supplied by its own weight or a natural drop. It is of course possible to dispose lubricant supply means such as a lubricant supply pump for lubricating the bearing 18 supporting the shaft 6 and to circulate and supply forcedly the lubricating oil to the bearing 18. In this case, any bearing may be employed so long as it can withstand the revolution of the shaft 6 at about 150,000 rpm and can support the shaft 6 while positioned between the turbine blade 14 and the A.C. generator-motor 4. In other words, the bearing to be used is not particularly limitative.

For example, the bearing 18 consists of a bearing member 29 which is either fixed or fitted idlely to the center housing 26 and a pair of floating bearing members 31 which are fitted idlely to the inner peripheral surface of the bearing member 29. Therefore, the lubricating oil from the oil reservoir 20 is supplied to the shaft 6, to the floating members 31 and to the gap between the bearing members 29 and at times, to the gap between the center housing 26 and the bearing members 29, through the lubricant supply path 19 formed in the center housing 29, the lubricant supply path 32 formed in the bearing member 29 and the lubricant supply path 33 formed in the floating bearing member. When the shaft 6 rotates at about 150,000 rpm, for example, the floating bearing members 31 rotate at about 70,000 rpm. When not fixed to the center housing 26, the bearing member 29 rotates at about 10,000 to about 30,000 rpm, so that the shaft 6 is supported rotatably under good condition.

Figure 3:
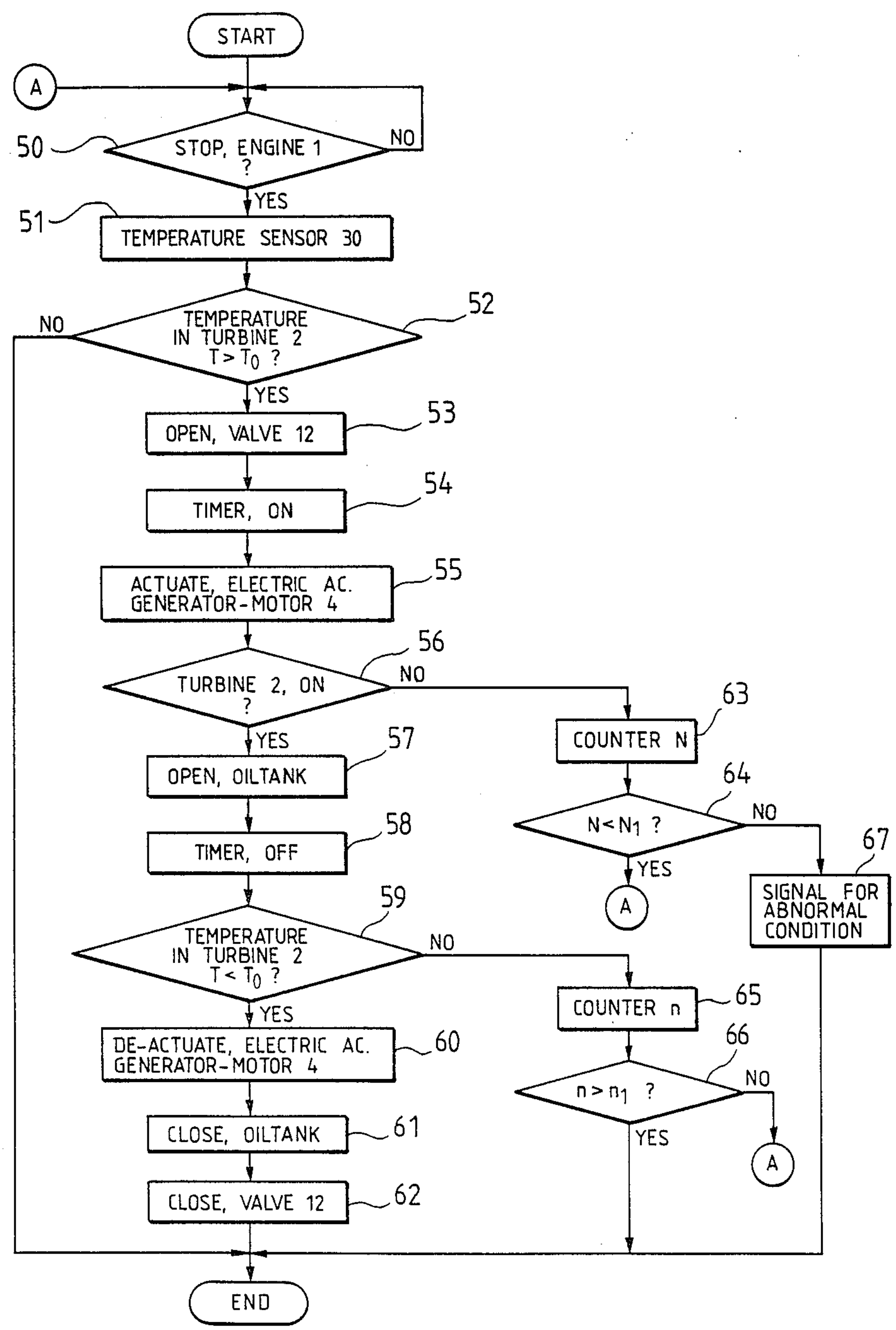
FIG. 3 is a flowchart useful for explaining the operation of the turbocharger of the present invention.

Next, the operation of the turbocharger 10 of the present invention and its control will be described with reference to FIGS. 1, 2 and 3. Incidentally, the technical facts that the turbocharger 10 operates while the engine 1 is driven, that a voltage is induced in the stator coil 17 by the turbine 2 by driving the A.C. generator-motor 4, is returned to the power source side and is charged to the battery 13 or the generator-motor is utilized as the generator which can use the regenerated voltage for charging the battery or can utilize it as the load, and that the A.C. generator-motor is used as the motor by receiving the A.C. power from the battery, are the same as in the turbocharger disclosed in the aforementioned reference Japanese Patent Laid-Open No. 195329/1985. Accordingly, the explanation of these operations will be hereby omitted.

The turbocharger in accordance with the present invention has its feature in the following operation. Namely, if the temperature T of the turbine housing T rises above a predetermined temperature To while the engine 1 is at halt, the A.C. power is supplied from the battery 13 to the A.C. generator-motor 4 by the control of the controller 5 so as to operate the A.C. generator-motor 4 as the motor. Since the A.C. generator-motor 4 operates as the motor, the air is sent from the compressor 3 to the turbine 2 so that the turbine 2 consisting of the turbine blade 14, the turbine shaft 25 and the turbine housing 22, and the shaft 6 as well as the center housing 26 are cooled.

An example of the operation control of the turbocharger in accordance with the present invention will be described with reference to the flowchart of FIG. 3.

It will be assumed, first of all, that the engine 1 comes to halt after the car drives on a highway, for example, and the engine 1, and hence, the turbocharger 10, is operated at a high load. In this case, whether or not the engine is at halt is judged and when it is, the processing moves to the next step (step 51) and if it is not, the processing returns to the first step (step 50).

When the engine 1 is at halt, the temperature sensor 30 disposed in the turbine housing 22 detects the temperature T of the turbine housing 22. Incidentally, the temperature sensor 30 can be disposed at various positions, and is disposed inside the turbine housing 22 in this embodiment (step 51).

Whether or not the temperature of the turbine housing 22, that is, the turbine 2, rises to a high temperature is judged and when it is lower than the predetermined preset temperature To, the processing is complete because there is no need to operate the A.C. generator-motor 4. When it is higher than the preset temperature To, on the other hand, the flow proceeds (step 52) to the next processing (step 53) in order to operate the A.C. generator-motor 4 as the motor.

The change-over valve 12 disposed in the pipe 11 that communicates the intake pipe 9 with the exhaust manifold 7 is opened and the discharge port of the compressor 3 and the intake port of the turbine scroll 21 are communicated so that the air or the cooling air can be introduced (step 53).

The timer is turned ON to supply the power to the A.C. generator-motor for a predetermined set time to operate it as the motor (steps 54 and 55).

When the operation of the A.C. generator-motor 4 as the motor is started, the shaft 6 rotates to rotate the impeller 15 of the compressor 3 and to operate the turbine blade 14 of the turbine 2. Here, whether or not the turbine blade 14 starts operating is judged and when it rotates, the air is sucked from the intake port 28 (in the direction represented by the arrow C) of the compressor 3, then sent into the exhaust manifold 7 from the compressor scroll 27 through the intake pipe 9 and the pipe 11, then into the turbine 2 from the exhaust manifold 7 through the turbine scroll 21 as represented by the arrow A and thereafter discharged from the discharge port as represented by the arrow B after cooling the turbine blade 14 (step 56).

When the turbine blade 14 of the turbine 2 does not operate, the counter counts the number of times of tries N and so long as this number of times of tries N is smaller than a predetermined number of times of tries $N_1$, the processing returns to the first step 50 and each processing is repeated (steps 63 and 64).

However, if the turbine blade 14 does not operate even though the number of times of tries N is greater than the predetermined number of times of tries $N_1$, judgement is made to the effect that any abnormality occurs in the turbocharger, an abnormality signal is raised to complete the processing and inspection and repair is carried out (step 67).

Simultaneously with the start of the operation of the turbine blade 14, the oil tank is opened so as to supply the lubricating oil from the oil reservoir 20 through the lubricant supply path 19 to lubricate the bearings 18. It is possible in this case to dispose a valve at the supply port of the oil reservoir 20 to make ON/OFF control of the valve or to lubricate the bearings 18 by use of an ordinary lubrication system. In the embodiment shown in the drawing, the oil reservoir 20 is disposed above the bearings 18 so that the lubricating oil drops naturally and self-lubricates the bearings 18. Moreover, since the shaft 6 is rotating, the lubricating oil is absorbed by the bearings 18 and lubrication can be made sufficiently to the bearings 18 (step 57).

As the air is sent into the turbine housing 22, the turbine 2, particularly the turbine housing 22, the turbine blade 14 and the turbine shaft 25, and along therewith, the shaft 6 and the center housing 26, are cooled. When the A.C. generator-motor 4 is operated as the motor for a predetermined period, the estimated time which can cool the turbine 2 is set temporarily to the timer and after the passage of the predetermined time set by the timer, the timer is turned OFF (step 58).

Here, the temperature T of the housing 22 is detected once again and is compared with the predetermined temperature To in order to judge if $T<To$ (step 59).

When the temperature T of the housing 22 is lower than the predetermined temperature To, the operation of the A.C. generator-motor 4 is stopped (step 60).

When the temperature T of the housing 22 is still higher than the predetermined temperature To, the counter counts the number of times of tries n and when the number of times of tries n is smaller than the predetermined number of times of tries $n_1$, the processing returns to the first step 50 and each processing is repeated. However, when the number of times of tries n is greater than the predetermined number of tries $n_1$, the processing is completed assuming that the temperature of the turbine 2 such as the temperature of the turbine housing 22 has already been below the predetermined temperature To (steps 65 and 66).

When the operation of the A.C. generator-motor 4 is stopped, the impeller 15 of the compressor 3 and the turbine blade 14 of the turbine 2 stop their rotation (step 60).

Furthermore, the oil tank is closed and the supply of the lubricating oil from the oil reservoir 20 to the bearing 18 is stopped (step 61).

The change-over valve 12 disposed in the pipe 11 is switched and closed to cut off the communication between the intake pipe 9 and the exhaust manifold 7, thereby establishing the state where the next operation of the engine 1 can be made (step 62).

Here, the operation of the A.C. generator-motor 4 as the motor is stopped. When the temperature of the turbine 2 is below the predetermined temperature To and when the engine starts again, however, the cooling operation of the turbine 2 is stopped and returns to the original state. This control will be obvious to those skilled in the art. The operation of the turbocharger described above is controlled by the steps of limiting temporarily the operation time by use of the timer, detecting once again the temperature of the turbine 2 by the temperature sensor 30 after the set operation time by the timer is complete, comparing it with the predetermined set temperature To and judging whether the cooling operation is continued or stopped. Accordingly, it is possible to detect reliably the drop of the temperature of the turbine 2 or the like.

As described above, since the turbocharger 10 is equipped with the self-cooling system, the turbine 2 can be cooled even when the engine 1 comes to halt after the turbocharger 10 is operated under the high load state and the turbine 2 rises to the high temperature by receiving the heat of the exhaust gas energy of the engine 1. Accordingly, the permanent magnet of the A.C. generator-motor is not affected adversely by the heat from the turbine 2 and the demagnetization of the permanent magnet does not occur. Moreover, the rotation of the shaft 6 does not stop while the shaft 6 and the bearings 18 are at the high temperature so that the lubricating oil supplied to the bearings 18 is neither solidified nor carbonized, and seizure does not occur, either. Accordingly, the turbocharger of the present invention is extremely effective as a seizure prevention apparatus of the turbocharger, too.

What is claimed is:

1. A turbocharger comprising:

a turbine equipped with a turbine blade connected to an exhaust pipe of an engine and driven by exhaust gas energy of said engine;

a compressor equipped with an impeller connected to an intake pipe of said engine and supercharges intake air into said engine when driven by said turbine;

a shaft having said turbine blade fixed at one of the ends thereof and said impeller fixed at the other end thereof;

a housing supporting rotatably said shaft through bearings;

an A.C. generator-motor equipped with a magnetic rotor fixed to said shaft and with a stator coil fitted to said housing, and operated either as a motor or as a generator;

a battery connected to said A. C. generator-motor;

temperature detection means for detecting the temperature of said turbine;

an oil reservoir connected to said bearing above said bearing for supporting said shaft; and control means for supplying the power from said battery to said A.C. generator-motor and operating said A.C. generator-motor as the motor when a temperature signal from said temperature detection means is above a predetermined set temperature after the stop of said engine, and for opening said oil reservoir to cause the natural drop of a lubricating oil staying in said oil reservoir to lubricate said bearing, and for closing said oil reservoir to restore an ordinary lubricatable state either when the temperature signal from said temperature detection means is below the predetermined set temperature or when the engine is driven.

2. A turbocharger according to claim 1, which further includes lubricating oil supply means for lubricating said bearings supporting said shaft and for circulating forcedly said lubricating oil to said bearings.

3. A turbocharger according to claim 1, which further includes a pipe for connecting directly said intake pipe to said exhaust pipe and a valve for opening and closing said pipe, disposed in said pipe, and wherein said valve is controlled and opened by said control means when said A.C. generator-motor is operated after the stop of the operation of said engine.

4. A turbocharger according to claim 1, wherein said intake pipe includes an intake manifold of said engine.

5. A turbocharger according to claim 1, wherein said exhaust pipe includes an exhaust manifold of

6. A turbocharger according to claim 1, wherein when the temperature of said turbine is below said predetermined set temperature, said control means closes said valve and stops its control of operating said A.C. generator-motor as the motor.

7. A turbocharger according to claim 6, wherein said temperature detection means is a temperature sensor disposed inside said turbine housing.

8. A turbocharger according to claim 1, wherein when said engine is driven, said control means closes said valve and stops its control of operating said A.C. generator-motor as the motor.

9. A turbocharger according to claim 1, wherein said temperature detection means is a temperature sensor disposed inside said housing.

10. A turbocharger according to claim 1, wherein said turbine blade in said turbine is disposed inside said turbine housing.

11. A turbocharger according to claim 1, wherein the period in which said A.C. generator-motor is operated as the motor by said control means is set by a timer.

* * * * *